(12) United States Patent
Kalm et al.

(10) Patent No.: US 10,919,747 B2
(45) Date of Patent: Feb. 16, 2021

(54) INVENTORY CONVEYANCE SYSTEM THAT TRANSFERS STORAGE CONTAINERS TO AND FROM A VERTICALLY ARRANGED ARRAY OF STORAGE CONTAINERS

(71) Applicant: Amazon Technologies, Inc., Seattle, WA (US)

(72) Inventors: William Scott Kalm, Seattle, WA (US); Peter A. Grant, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/253,868

(22) Filed: Jan. 22, 2019

(65) Prior Publication Data
US 2020/0231419 A1    Jul. 23, 2020

(51) Int. Cl.
*B66F 9/07*   (2006.01)
*B65G 1/04*   (2006.01)

(52) U.S. Cl.
CPC .............. *B66F 9/07* (2013.01); *B65G 1/0407* (2013.01)

(58) Field of Classification Search
CPC ........ B65G 1/0407; B65G 1/0435; B66F 9/07
See application file for complete search history.

(56) References Cited

U.S. PATENT DOCUMENTS

| | | | | |
|---|---|---|---|---|
| 8,577,585 B2 * | 11/2013 | Atmur et al. | ........... | B61B 13/12 701/117 |
| 9,428,336 B2 * | 8/2016 | Hagen | ................... | G07F 11/165 |
| 9,919,869 B2 * | 3/2018 | Tanaka | ................. | B65G 1/0407 |
| 2003/0102277 A1 | 6/2003 | Tai et al. | | |
| 2013/0209203 A1 * | 8/2013 | Rafols | .................. | B65G 1/0407 414/279 |
| 2014/0079518 A1 * | 3/2014 | Qi | ............................. | B66F 9/07 414/632 |
| 2017/0001800 A1 * | 1/2017 | Fukayama | ................ | B66F 9/07 |

(Continued)

FOREIGN PATENT DOCUMENTS

| | | |
|---|---|---|
| EP | 2589550 A1 | 5/2013 |
| EP | 3135609 A1 | 3/2017 |
| WO | WO 2018/074130 A1 | 4/2018 |

OTHER PUBLICATIONS

U.S. Appl. No. 16/037,424, filed Jul. 17, 2018, Kalm et al.

(Continued)

*Primary Examiner* — Kaitlin S Joerger
(74) *Attorney, Agent, or Firm* — BakerHostetler (57) ABSTRACT

In one embodiment, an inventory conveyance system has at least one longitudinal track that is elongate along a longitudinal direction. The system has at least one transverse track that extends from the at least one longitudinal track along a transverse direction that is angularly offset from the longitudinal direction. The transverse track can ride along the at least one longitudinal track along the longitudinal direction. The system has at least one inventory transfer vehicle that is coupled to the transverse track such that the transfer vehicle can ride along the at least one transverse track along the transverse direction. The at least one inventory transfer vehicle has a body, and at least one end effector supported by the body. The at least one end effector can removably couple to an inventory storage container.

22 Claims, 7 Drawing Sheets

(56) References Cited

U.S. PATENT DOCUMENTS

| | | | |
|---|---|---|---|
| 2017/0036859 A1* | 2/2017 | Lopes Ribeiro | B65G 1/137 |
| 2018/0111757 A1 | 4/2018 | Abe et al. | |
| 2018/0339858 A1* | 11/2018 | Iwata | B65G 1/0435 |
| 2019/0092567 A1* | 3/2019 | Lawrence | A01G 9/143 |
| 2019/0241415 A1* | 8/2019 | Tanaka | B65G 1/0407 |

OTHER PUBLICATIONS

"Vertical Case Lift"; https://www.bastiansolutions.com/solutions/service/industrial-robotics/ancillary-equipment/vertical-case-lifts/; Bastian Solutions; © 2019; accessed Mar. 25, 2019; 13 pages.

"Mini-load ASRS High Throughput"; https://www.youtube.com/watch?v=mcibfbd_9y0; YouTube; accessed Mar. 25, 2019; 3 pages.

"Store more materials in less space with mini load AS/RS"; https://www.bastiansolutions.com/solutions/technology/asrs/mini-load/; Bastian Solutions; © 2019; accessed Mar. 25, 2019; 7 pages.

* cited by examiner

INVENTORY CONVEYANCE SYSTEM THAT TRANSFERS STORAGE CONTAINERS TO AND FROM A VERTICALLY ARRANGED ARRAY OF STORAGE CONTAINERS

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, the inventory item can be carried down an aisle in the warehouse to the desired shelving unit and placed onto the desired shelving unit where it is stored until it is needed. When an order is placed, the inventory item can be retrieved from the desired shelving unit, and placed on a conveyor belt that carries the inventory item downstream for packaging and shipping.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

Figure 1:
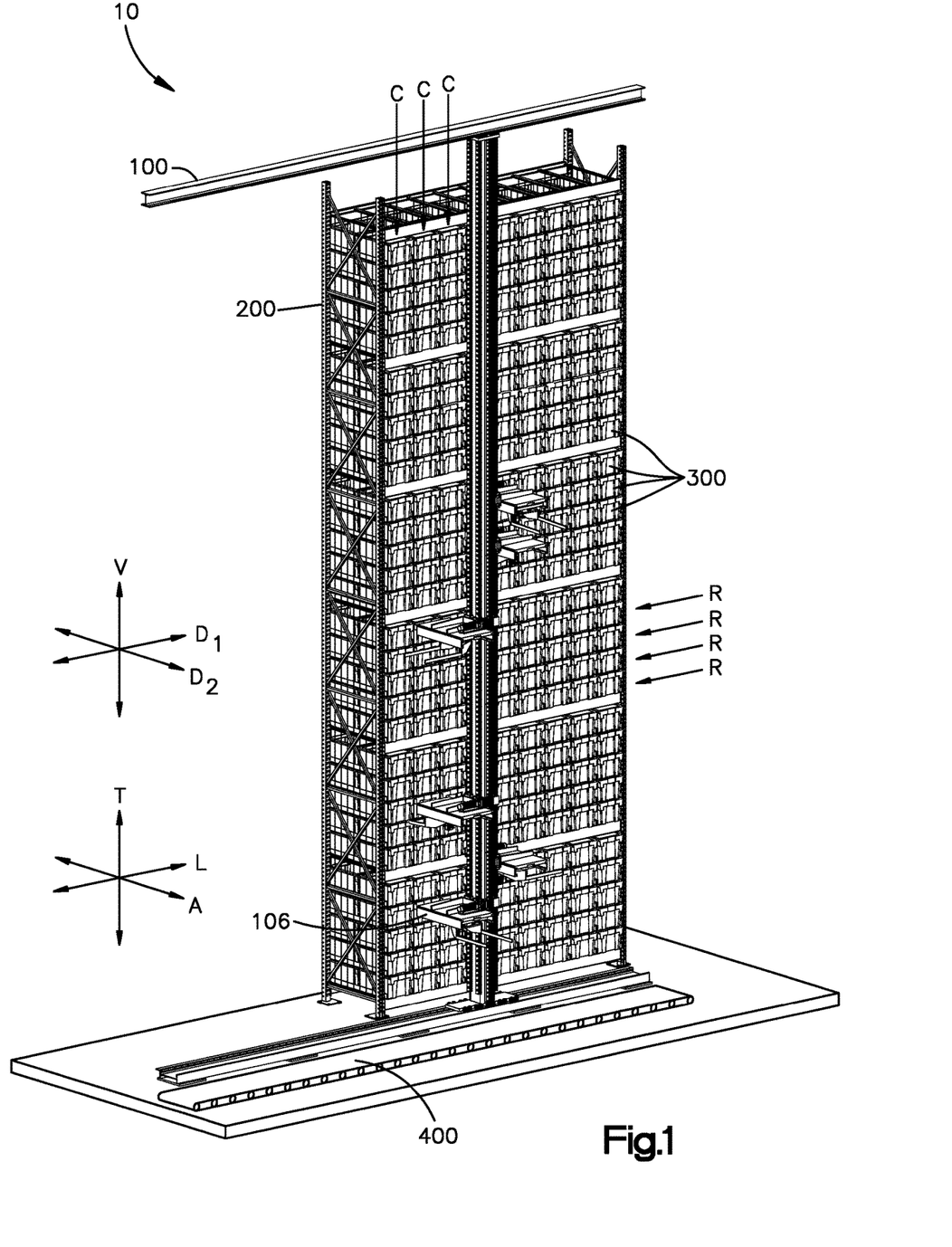
FIG. 1 shows a perspective view of an inventory processing system according to one embodiment having an inventory support structure and an inventory conveyance system.
Figure 3:
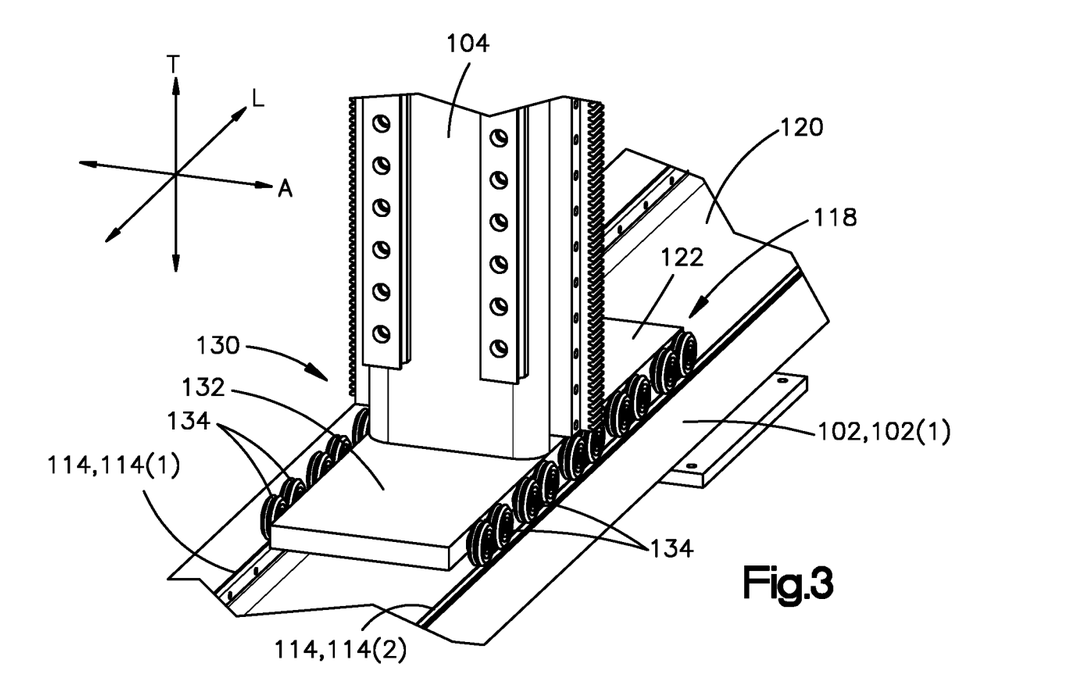
FIG. 3 shows an enlarged view of a portion of the inventory conveyance system of FIG. 2 that includes an interface between the lower longitudinal track and the transverse track.

Due to difficulties in moving inventory items of different sizes and shapes, the inventory items can be moved in storage containers such as the inventory storage containers 300 shown in FIGS. 1 and 3. The inventory storage containers 300 can be stored in a vertical array that includes rows and columns of the storage containers 300. For example, the storage containers 300 can be supported by a shelving system so as to define the array. In E-commerce applications, it is important to be able to transfer the storage containers 300 to and from the array quickly and easily so as to limit processing time of the inventory. Limiting processing time can increase the speed in which inventory items can be retrieved and shipped to a customer. Presented herein are inventory conveyance systems that can transfer inventory storage containers 300 to and from such an array.

Referring to FIG. 1, an inventory processing system 10 is shown according to one embodiment. In general, the inventory processing system 10 is configured to store and retrieve inventory items. The inventory processing system 10 has an inventory storage structure 200 that is configured to support inventory storage containers 300 thereon. Each inventory storage container 300 can be any suitable storage container configured to carry one or more inventory items therein. Preferably, the inventory storage containers 300 are open-top plastic totes configured to carry items in an e-commerce supply chain. The totes are of a size that an individual person or robot can lift.

The inventory storage structure 200 can be configured to support the inventory storage containers 300 in a vertically-oriented array of storage containers 300. Thus, the storage structure 200 can support the storage containers 300 such that the inventory storage containers 300 are arranged in a plurality of rows R and columns C. The storage containers 300 in each row R can be offset from one another along a first horizontal direction $D_1$, and the rows R can be offset from one another along a vertical direction V, that is substantially perpendicular to the first horizontal direction $D_1$. The storage containers 300 in each column C can be offset from one another along the vertical direction V, and the columns C can be offset from one another along the first horizontal direction $D_1$. The inventory storage structure 200 can be configured as a shelving system. Alternatively, the inventory storage structure 200 can be configured as any other system that supports storage containers 300 in rows and columns, such as a movable storage system in which the storage containers 300 can be rotated. For example, the movable storage system can be implemented in a manner similar to that disclosed in U.S. patent application Ser. No. 16/037,424, the teachings of which are hereby incorporated by reference as if set forth in their entirety herein.

The inventory processing system 10 also has an inventory conveyance system 100 disposed adjacent to the inventory storage structure 200 with respect to a second horizontal direction $D_2$ that is substantially perpendicular to both the first horizontal direction $D_1$ and the vertical direction V. The inventory conveyance system 100 is configured to stow the inventory storage containers 300 onto the inventory storage structure 200 and/or retrieve the inventory storage containers 300 from the inventory storage structure 200. In one example, the inventory processing system 10 can include at least one separate storage destination 400 that is separate and distinct from the inventory storage structure 200. In some examples, the at least one separate storage destination 400 can be a material conveyance device, such as a belt conveyor or roller conveyor, disposed adjacent to the inventory conveyance system 100. For example, the inventory conveyance system 100 can be disposed between the at least one separate storage destination 400 and the inventory storage structure 200. The inventory conveyance system 100 can be configured to transfer storage containers 300 between the separate storage destination 400 and the inventory storage structure 200. For example, the separate storage destination 400 can receive storage containers 300 from upstream processing (such as sorting), and the inventory conveyance system 100 can be configured to move the storage containers 300 from the separate storage destination 400 to the inventory storage structure 200 so as to stow the storage containers 300 on the inventory storage structure 200. Additionally or alternatively, the inventory conveyance system 100 can be configured to retrieve storage containers 300 from inventory storage structure 200, and move the storage containers 300 to the separate storage destination 400, which can in turn deliver the storage containers 300 to downstream processing (such as packaging).

Figure 2:
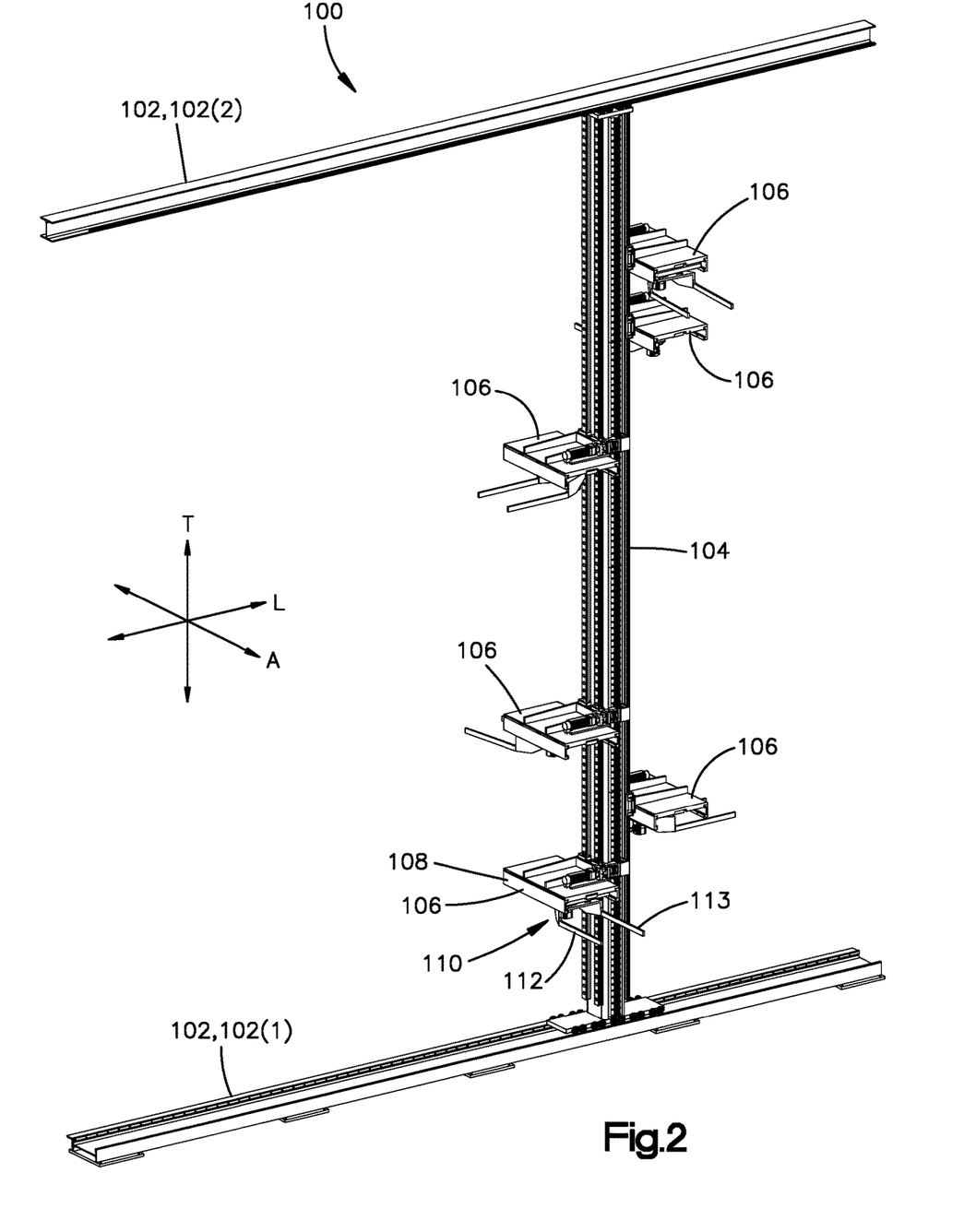
FIG. 2 shows a perspective view of the inventory conveyance system of FIG. 1 according to one embodiment, the inventory conveyance system having a lower longitudinal track, an upper longitudinal track, and a transverse track that extends between the upper and lower longitudinal tracks.

Turning now to FIG. 2, the inventory conveyance system 100 is shown according to one embodiment without the inventory support structure 200. In general, the inventory conveyance system 100 comprises at least one longitudinal track 102 that is elongate along a longitudinal direction L. The inventory conveyance system 100 comprises at least one transverse track 104 that extends from the at least one longitudinal track 102 along a transverse direction T that is angularly offset from the longitudinal direction L. In one example, the transverse direction T can be substantially perpendicular to the longitudinal direction L, such as within ±15 degrees of being perpendicular to the longitudinal direction L. The transverse track 104 is configured to ride along the at least one longitudinal track 102 along the longitudinal direction L.

The inventory conveyance system 100 comprises at least one inventory transfer vehicle 106 that is configured to ride along the at least one transverse track 104 along the transverse direction T. The at least one inventory transfer vehicle 106 comprises a vehicle body 108 and at least one end effector 110 carried by the vehicle body 108. The at least one end effector 110 has a pair of prongs 112 that are offset from one another so as to define a fork 113 that is configured to receive a storage container 300 between the pair of prongs 112. The end effector 110 can be configured to move the pair of prongs 112 inward and outward along a lateral direction A, that is substantially perpendicular to the longitudinal direction L and transverse direction T. The end effector 110, such as the pair of prongs 112 of the end effector 110, can be configured to rotate relative to the vehicle body 108 about an axis that extends along the transverse direction T. The at least one inventory transfer vehicle 106 is configured to removably couple to a storage container 300 and carry the storage container 300 so as to stow the storage container 300 onto the storage structure 200 or remove the storage container 300 from the inventory storage structure 200. In alternative embodiments, the inventory conveyance system 100 can include end effectors other than forks, including any other suitable end effector configured to grab an object from a storage structure 200.

The inventory conveyance system 100 can comprise as few as one inventory transfer vehicle 106, or a plurality of inventory transfer vehicles 106 that are configured to ride along the transverse track 104. Each inventory transfer vehicle 106 can carry an end effector 108. Additionally, the inventory conveyance system 100 can include as few as one transverse track 104, or a plurality of transverse tracks 104 that are offset from one another along the longitudinal direction L. Each transverse track 104 can support at least one inventory transfer vehicle 106 that rides along the transverse track 104 along the transverse direction and that carries an end effector 108. The plurality of transverse tracks 104 can work concurrently to stow and/or retrieve storage containers 300, thereby increasing the rate at which the storage containers 300 can be stowed and/or retrieved. In some examples, the plurality of transverse tracks 104 can be configured to service (i.e., stow and/or remove storage containers 300) shared sections of the inventory storage structure 200. In other examples, the inventory storage structure 200 can be divided into storage sections that are offset from one another along the first horizontal direction $D_1$, and each transverse track 104 can be configured to service a different one of the storage sections.

The at least one longitudinal track 102 can include a first longitudinal track 102(1) that is elongate along the longitudinal direction L. In some examples, the at least one longitudinal track 102 can include a second longitudinal track 102(2) that is elongate along the longitudinal direction L. The first and second longitudinal tracks 102(1) and 102(2) can be spaced from one another along the transverse direction T. In some examples, the first and second longitudinal tracks 102(1) and 102(2) can be substantially parallel to one another, such as within ±15 degrees of being parallel to one another. In such embodiments, the transverse track 104 can extend from the first longitudinal track 102(1) to the second longitudinal track 102(2). For example, the transverse track 104 can terminate at the first longitudinal track 102(1) and at the second longitudinal track 102(2).

In some embodiments, the longitudinal direction L can be aligned with the first horizontal direction $D_1$ and the transverse direction T can be aligned with the vertical direction V as shown in FIG. 1 such that the transverse track 104 is elongate along the vertical direction V. In alternative embodiments, the longitudinal direction L can be aligned with the vertical direction V, and the transverse direction T can be aligned with the first horizontal direction $D_1$ such that the transverse track 104 is elongate along the first horizontal direction $D_1$.

Figure 4:
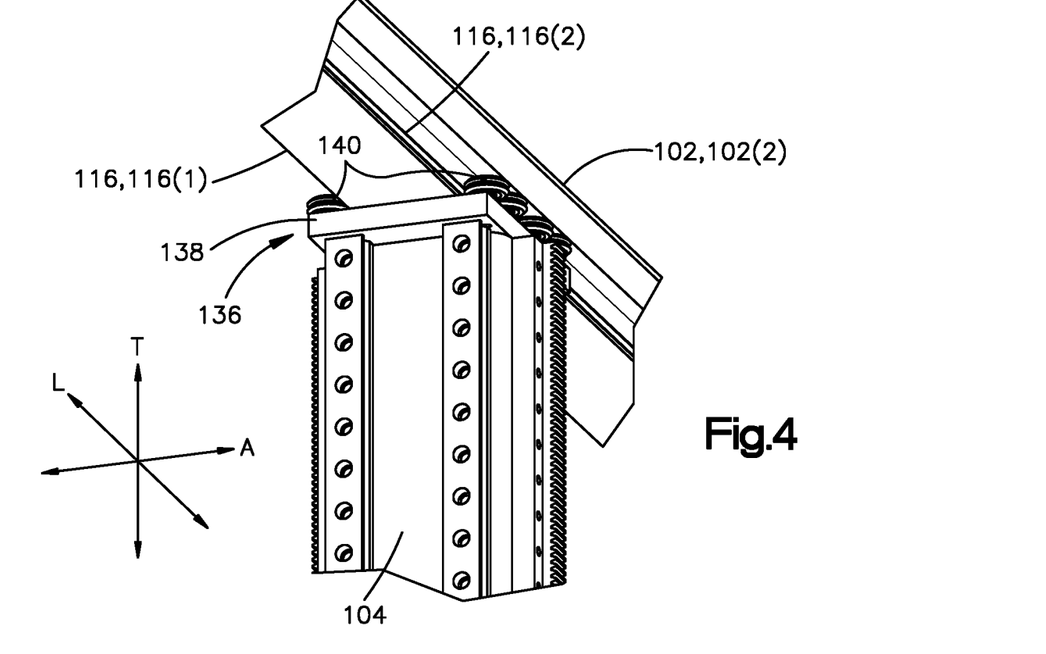
FIG. 4 shows an enlarged view of a portion of the inventory conveyance system of FIG. 2 that includes an interface between the upper longitudinal track and the transverse track.

Turning to FIGS. 3 and 4, the at least one transverse track 104 comprises a first end 130, and a second end 136 that is spaced from the first end along the transverse direction T. The first end 130 is configured to couple to the first longitudinal track 102(1). In embodiments that implement the second longitudinal track 102(2), the second end 132 is configured to couple to the second longitudinal track 102(2). Each of the at least one longitudinal track 102 can be a stationary track that is stationary relative to the facility at which the inventory conveyance system 100 is installed. For example, the first longitudinal track 102(1) can be mounted to a floor of the facility such that the first longitudinal track 102(1) is stationary relative to the floor. The second longitudinal track 102(2) (when employed) can be positionally fixed relative to the first longitudinal track 102(1) by support structure (not shown) so as to be spaced a fixed distance from the first longitudinal track 102(1). Each longitudinal track 102 can be modular such that the longitudinal track 102 can be lengthened or shortened. For example, each longitudinal track 102 can include modular track segments that can be coupled end-to-end along the longitudinal direction L so as to lengthen the longitudinal track 102, and can be decoupled from the ends of the longitudinal track 102 so as to shorten the longitudinal track 102.

Referring more specifically to FIG. 3, the first end 130 comprises a coupler 132 that is configured to couple the transverse track 104 to the first longitudinal track 102(1) such that the first end 130 can ride or translate along the first longitudinal track 102(1). The coupler 132 can comprise a plurality of wheels 134 that are configured to ride along the first longitudinal track 102(1) along the longitudinal direction L. Each wheel 134 can be configured to rotate about an axis that extends along the lateral direction A. The wheels 134 can include a first and second sets of wheels that are offset from one another along a lateral direction A, substantially perpendicular to the longitudinal direction L and transverse direction T. The coupler 132 can be configured to prevent the transverse track 104 from moving relative to the first longitudinal track 102(1) along at least one of the lateral direction A and the transverse direction T. For example, the wheels 134 of the coupler 132 can define grooves that are configured to engage with rails of the first longitudinal track 102(1) so as to prevent the first end 130 of the transverse track 104 from moving relative to the first longitudinal track 102(1) along the lateral direction A. It will be understood that, in alternative embodiments, the coupler 132 can be configured in any other suitable manner that couples the first end 130 to the first longitudinal track 102(1), while allowing the transverse track 104 to translate along the first longitudinal track 102(1) along the longitudinal direction L.

The first longitudinal track 102(1) can include at least one rail 114 that is elongate along the longitudinal direction L. For example, the first longitudinal track 102(1) can include first and second rails 114(1) and 114(2) that extend along the longitudinal direction L. Each rail 114 can be linear along the longitudinal direction L. Each rail 114 can be configured to guide wheels 134 of the transverse track 104 as the wheels 134 rides along the rail 114. For example, each rail 114 can have a guide surface that faces the transverse direction T and is configured to support the wheels 134 thereon as the wheels 134 ride along the guide surface. Thus, the wheels 140 can engage the rails 114 along the transverse direction T. It will be understood that track configurations other than that shown in FIG. 3 can be employed within the scope of the present disclosure. For example, the inventory conveyance system 100 can be implemented with a single rail 114. As another example, the inventory conveyance system 100 can be implemented with a track other than a rail that guides wheels 134, such as a track that guides a chain. As yet another example, the wheels 134 and rails 114 can be configured to engage one another along the lateral direction A.

Turning now more specifically to FIG. 4, in embodiments that employ the second longitudinal track 102(2), the second end 136 comprises a coupler 138 that is configured to couple the transverse track 104 to the second longitudinal track 102(2) such that the second end 136 can ride or translate along the second longitudinal track 102(2). The coupler 138 can comprise a plurality of wheels 140 that are configured to ride along the second longitudinal track 102(2) along the longitudinal direction L. Each wheel 140 can be configured to rotate about an axis that extends along the transverse direction T. The wheels 140 can include a first and second sets of wheels that are offset from one another along the lateral direction A. The coupler 138 can be configured to prevent the transverse track 104 from moving relative to the second longitudinal track 102(2) along at least one of the lateral direction A and the transverse direction T. For example, the first and second sets of wheels 140 can be disposed on opposed sides of the first longitudinal track 102(1) so as to prevent the second end 136 of the transverse track 104 from moving relative to the second longitudinal track 102(2) along the lateral direction A. Additionally or alternatively, the wheels 140 of the coupler 138 can define grooves that are configured to engage with rails of the second longitudinal track 102(2) so as to prevent the second end 136 of the transverse track 104 from moving relative to the second longitudinal track 102(2) along the transverse direction T.

The second longitudinal track 102(2) can include at least one rail 116 that is elongate along the longitudinal direction L. For example, the second longitudinal track 102(1) can include first and second rails 116(1) and 116(2) that extend along the longitudinal direction L. Each rail 116 can be linear along the longitudinal direction L. Each rail 116 can be configured to guide wheels 140 of the transverse track 104 as the wheels 140 ride along the rail 116. For example, each rail 116 can have a guide surface that faces a lateral direction A, substantially perpendicular to the longitudinal direction L and transverse direction T, that is configured to support at least wheel 140 thereon as the wheel 140 rides along the guide surface. Thus, the wheels 140 can engage the rails 116 along the lateral direction A. The guide surfaces of the first and second rails 116(1) and 116(2) can face away from one another. It will be understood that track configurations other than that shown in FIG. 4 can be employed within the scope of the present disclosure. For example, the inventory conveyance system 100 can be implemented with a single rail 114. As another example, the inventory conveyance system 100 can be implemented with a track other than a rail that guides wheels, such as a track that guides a chain. As yet another example, the wheels 140 and rails 116 can be configured to engage one another along the transverse direction T.

The inventory conveyance system 100 comprises at least one actuator 118 that is configured to drive the at least one transverse track 104 to move along the longitudinal direction L. Each actuator can be a linear induction motor having a primary 120 and a secondary 122. The primary 120 of the linear induction motor can be implemented by at least one of the longitudinal tracks 102, such as by the first longitudinal track 102(1). Thus, the first longitudinal track 102(1) can comprise the primary 120. The secondary 122 of the linear induction motor can be implemented by the transverse track 104, such as by the coupler 132 of the transverse track 104. Thus, the coupler 132 of the transverse track 104 can comprise the secondary 122. The coupler 132 can include a body or plate that defines the secondary 122.

In alternative embodiments, the inventory conveyance system 100 can additionally or alternatively comprise an actuator (not show) at the second end 136 of the at least one transverse track 104. The actuator at the second end 136 can be a linear induction motor. In such embodiments, the second longitudinal track 102(2) can comprise the primary of the linear induction motor, and the coupler 138 can comprise the secondary of the linear induction motor. It will be understood that, in alternative embodiments, the at least one actuator 118 of the inventory conveyance system 100 can be any other suitable linear actuator that is capable of moving the transverse track 104 along the longitudinal direction, including (without limitation) a hydraulic actuator, a pneumatic actuator, an electro-mechanical actuator, or a mechanical actuator such as a wheel and axle actuator (e.g., rack and pinion, chain drive, and belt drive) or a screw actuator (e.g., leadscrew, screw jack, ball screw, or roller screw actuator).

Figure 5:
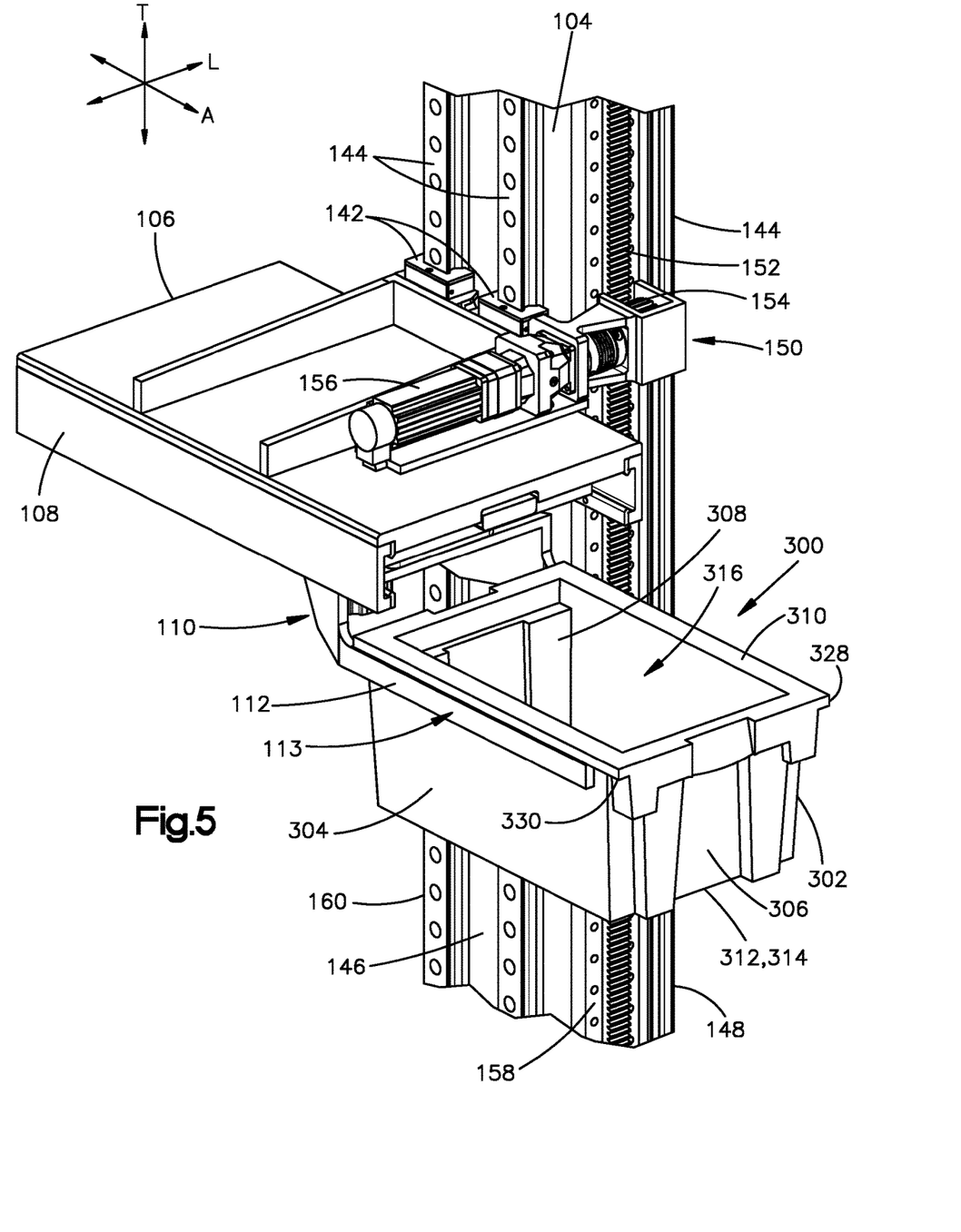
FIG. 5 shows an enlarged view of a portion of the inventory conveyance system of FIG. 2 that includes an intermediate portion of the transverse track and an inventory transfer vehicle coupled to the transverse track.

Turning now to FIG. 5, the at least one inventory transfer vehicle 106 can comprise a vehicle body 108 and at least one coupler 142 that is configured to couple the vehicle body 108 to the transverse track 104 such that the inventory transfer vehicle 106 can ride or translate along the transverse track 104 along the transverse direction T. For example, the transverse track 104 can include at least one rail 144 that is elongate along the transverse direction T. The at least one coupler 142 can be configured to ride or translate along the at least one rail 144 along the transverse direction T. The at least one coupler 142 can be configured to prevent the inventory transfer vehicle 106 from moving relative to the transverse track 104 along at least one of the longitudinal direction L and the lateral direction A. Thus, the inventory transfer vehicle 106 can be coupled to the transverse track 104 such that the inventory transfer vehicle 106 moves with the transverse track 104 along the longitudinal direction L. The at least one rail 144 can be a linear bearing rail, and the at least one coupler 142 can be a runner block of a linear bearing. Thus, the inventory conveyance system 100 can include at least one linear bearing that comprises a rail 144 of the transverse track 104 and a coupler 142 of an inventory transfer vehicle 106. It will be understood, however, that the inventory conveyance system 100 can include types of rails and couplers other than those of a linear bearing.

The transverse track 104 can have a first longitudinal side 146 and a second longitudinal side 148 that are offset from one another along the longitudinal direction L. The transverse track 104 can include at least one rail 144 along the first longitudinal side 146. The at least one inventory transfer vehicle 106 can include a first inventory transfer vehicle 106 that is configured to couple to at least one rail 144 at the first longitudinal side 146. For example, the first inventory transfer vehicle 106 can include at least one coupler 142 that is configured to couple to the at least one rail 144 at the first longitudinal side 146.

In some examples, the at least one rail 144 can include a plurality of rails 144 along the first longitudinal side 146, such as a pair of linear rails 144. The plurality of rails 144 can be spaced from one another along the lateral direction A. The first inventory transfer vehicle 106 can include a plurality of couplers 142, such as a pair of couplers 142, that are configured to couple to the plurality of rails 144 at the first longitudinal side 146. The plurality of couplers 142 can be spaced from one another along the lateral direction A.

The transverse track 104 can optionally include at least one rail 144 along the second longitudinal side 148. The at least one inventory transfer vehicle 106 can include a second inventory transfer vehicle 106 that is configured to couple to the second longitudinal side 148. The second inventory transfer vehicle 106 can include at least one coupler 142 that is configured to couple to the at least one rail 144 at the second longitudinal side 148. In some examples, the second longitudinal side 148 can be a mirror image of the first longitudinal side 146. As a result, the inventory transfer vehicles 106 can be configured to selectively couple to the first longitudinal side 146 and to the second longitudinal side 148.

In some examples, the at least one rail 144 can include a plurality of rails 144 along the second longitudinal side 148, such as a pair of linear rails 144. The plurality of rails 144 at the second longitudinal side 148 can be spaced from one another along the lateral direction A. The second inventory transfer vehicle 106 can include a plurality of couplers 142, such as a pair of couplers 142, that are configured to couple to the plurality of rails 144 at the second longitudinal side 148. The plurality of couplers 142 can be spaced from one another along the lateral direction A.

The inventory conveyance system 100 comprises at least one actuator 150 that is configured to drive the at least one inventory transfer vehicle 106 to move along the transverse direction T. Each actuator 150 can be a rack and pinion actuator having a rack 152 and a pinion gear 154. The rack 152 can be implemented by the at least one transverse track 104. Thus, the at least one transverse track 104 can include at least one rack 152. The at least one pinion gear 154 can be implemented by the at least one inventory transfer vehicle 106. Thus, each inventory transfer vehicle 106 can comprise at least one pinion gear 154. Each inventory transfer vehicle 106 can also comprise at least one motor 156 that is configured to drive it's at least one pinion gear 154 to rotate. In one example, the at least one pinion gear 154 can rotate about an axis that extends along the longitudinal direction such that the teeth of the pinion gear 154 engage the teeth of the rack 152. It will be understood that, in alternative embodiments, the at least one actuator 150 can be any other suitable linear actuator that is capable of moving the at least one inventory transfer vehicle 106 along the transverse track 104 along the transverse direction T, including (without limitation) a hydraulic actuator, a pneumatic actuator, an electro-mechanical actuator, or a mechanical actuator such as a wheel and axle actuator (e.g., chain drive, and belt drive) or a screw actuator (e.g., leadscrew, screw jack, ball screw, or roller screw actuator).

The at least one transverse track 104 can have a first lateral side 158 and a second lateral side 160 that are offset from one another along the lateral direction A. The at least one transverse track 104 can include at least one rack 152 along the first lateral side 158. The at least one inventory transfer vehicle 106 can include a first inventory transfer vehicle 106 having a pinion 154 that is configured to engage the at least one rack 152 at the first lateral side 158 when the inventory transfer vehicle 106 is coupled to the first longitudinal side 146. Optionally, the transverse track 104 can include at least one rack 152 at the second lateral side 160. The at least one inventory transfer vehicle 106 can include a second inventory transfer vehicle 106 having a pinion 154 that is configured to engage the at least one rack 152 at the second lateral side 160 when the second inventory transfer vehicle 106 is coupled to the second longitudinal side 148. In some examples, the second lateral side 160 can be a mirror image of the first lateral side 158. As a result, the inventory transfer vehicles 106 can be configured to selectively couple to the first longitudinal side 146 and to the second longitudinal side 148.

The at least one transverse track 104 can be modular such that the transverse track 104 can be lengthened or shortened. For example, the at least one transverse track 104 can include modular track segments that can be coupled end-to-end along the transverse direction T so as to lengthen the transverse track 104, and can be decoupled from the ends of the transverse track 104 so as to shorten the transverse track 104. When lengthening or shortening the at least one transverse track 104, one of the first and second longitudinal tracks 102(1) and 102(2) can be correspondingly moved to increase or decrease the space between the first and second longitudinal tracks 102(1) and 102(2) so as to accommodate the length of the transverse track 104.

Figure 7:
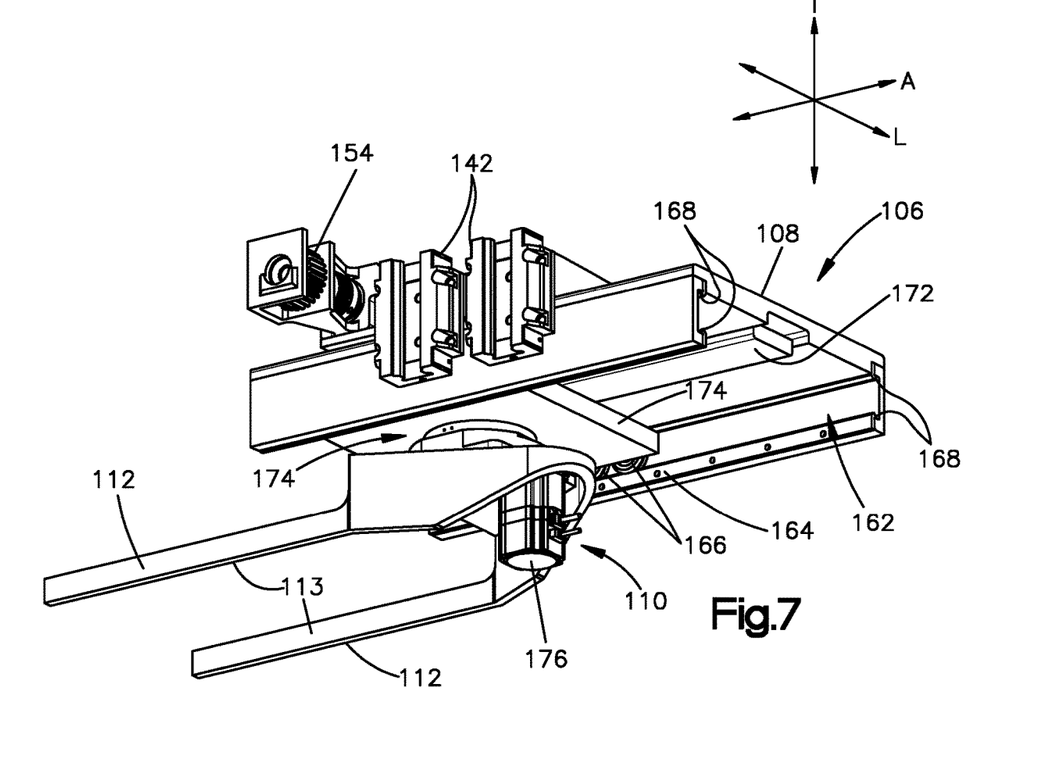
FIG. 7 shows a bottom perspective view of the inventory transfer vehicle of FIG. 6.
Figure 8:
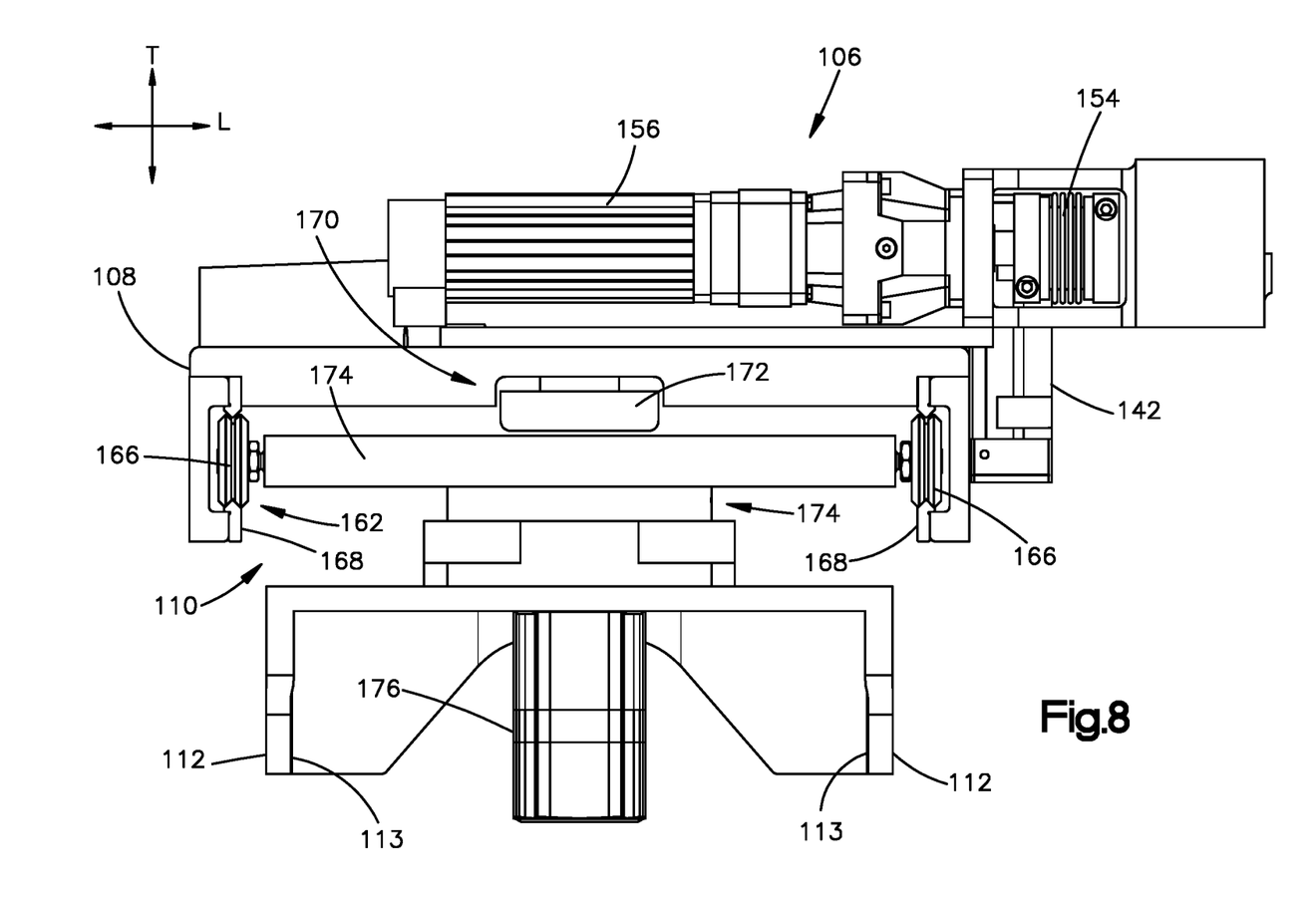
FIG. 8 shows an end elevation view of the inventory transfer vehicle of FIG. 6.

Turning now to FIGS. 7 and 8, the end effector 110 can be coupled to the vehicle body 108 such that the end effector 110 can translate inwardly and outwardly along the lateral direction A. For example, the vehicle body 108 can comprise a lateral track 162, and the end effector 110 can be coupled to the lateral track 162. The end effector 110 can comprise a coupler 164 that is configured to couple the end effector 110 to the vehicle body 108 such that end effector 110 can ride or translate along the lateral track 162. The coupler 164 can comprise a plurality of wheels 166 that are configured to ride along the lateral track 162 along the lateral direction A. Each wheel 166 can be configured to rotate about an axis that extends along the longitudinal direction L. The wheels 166 can include a first and second sets of wheels that are offset from one another along the longitudinal direction L. The coupler 164 can be configured to prevent the end effector 110 from moving relative to the lateral track 162 along at least one of the longitudinal direction L and the transverse direction T. For example, the wheels 166 of the coupler 164 can define grooves that are configured to engage with rails of the lateral track 162. It will be understood that, in alternative embodiments, the coupler 164 can be configured in any other suitable manner that couples the end effector 110 to the lateral track 162, while allowing the end effector 110 to translate along the lateral track 162 along the lateral direction A.

The lateral track 162 can include at least one rail 168 that is elongate along the lateral direction A. For example, the lateral track 162 can include first and second rails 168 that extend along the lateral direction A. Each rail 168 can be linear along the lateral direction A. Each rail 168 can be configured to guide wheels 166 of the end effector 110 as the wheels 166 ride along the rail 168. For example, each rail 168 can have a guide surface that faces the transverse direction T and is configured to support the wheels 166 thereon as the wheels 166 ride along the guide surface. Thus, the wheels 166 can engage the rails 168 along the transverse direction T. It will be understood that track configurations other than that shown in FIGS. 7-8 can be employed within the scope of the present disclosure. For example, the inventory transfer vehicle 106 can be implemented with a single rail 168. As another example, the inventory transfer vehicle 106 can be implemented with a track other than a rail that guides wheels 166, such as a track that guides a chain. As yet another example, the wheels 166 and rails 168 can be configured to engage one another along the longitudinal direction L.

The inventory transfer vehicle 106 comprises at least one actuator 170 that is configured to drive the end effector 110 to move along the lateral direction A. The actuator 170 can be a linear induction motor having a primary 172 and a secondary 174. The primary 172 of the linear induction motor can be implemented by the vehicle body 108. Thus, the vehicle body 108 can comprise the primary 172. The secondary 174 of the linear induction motor can be implemented by the end effector 110, such as by the coupler 164 of the end effector 110. Thus, the coupler 164 of the end effector 110 can comprise the secondary 174. The coupler 164 can include a body or plate that defines the secondary 174. It will be understood that, in alternative embodiments, the actuator 170 of the inventory transfer vehicle 106 can be any other suitable linear actuator that is capable of moving the end effector 110 along the lateral direction A, including (without limitation) a hydraulic actuator, a pneumatic actuator, an electro-mechanical actuator, or a mechanical actuator such as a wheel and axle actuator (e.g., rack and pinion, chain drive, and belt drive) or a screw actuator (e.g., leadscrew, screw jack, ball screw, or roller screw actuator).

The end effector 110 can be configured such that the fork 113 rotates about an axis that extends along the transverse direction T. For example, the end effector 110 can include a joint 174, and the fork 113 can be configured to rotate at the joint 174. The end effector 110 can include a motor 176 that is configured to rotate the fork 113 at the joint 174. In one example, the motor 176 can be a pancake motor.

Figure 6:
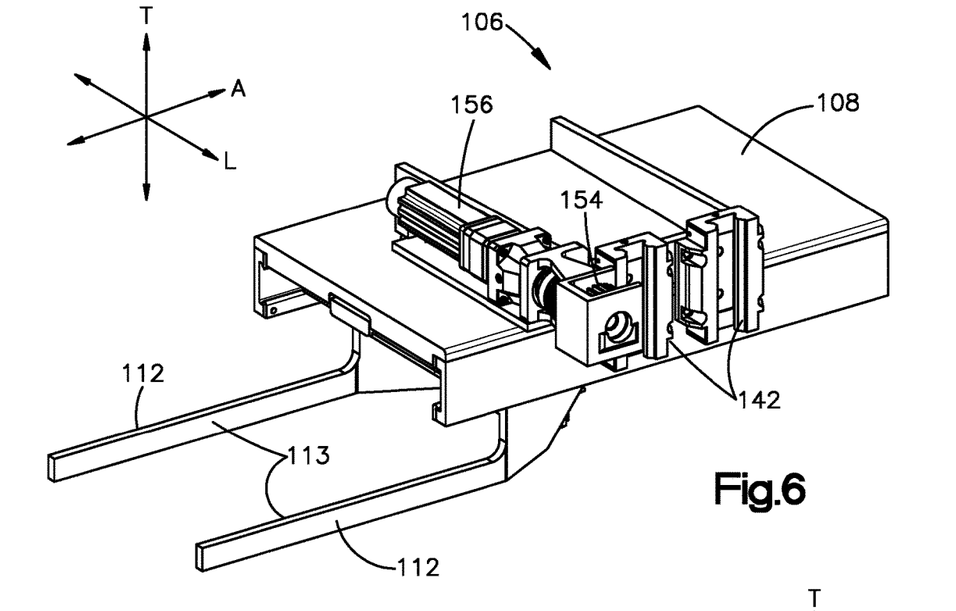
FIG. 6 shows a top perspective view of an inventory transfer vehicle of the inventory conveyor system of FIG. 2 according to one embodiment.

Referring to FIGS. 5 and 6, the fork 113 is configured to removably couple to a storage container 300. The storage container 300 can be a rectangular structure, such as a bin or tote, formed from a rigid material such as high-density plastic, wood, aluminum, or other suitable material. The storage container 300 can have first and second container sidewalls 302 and 304 that are spaced opposite from one another. The storage container 300 can have a first and second container end walls 306 and 308 that are spaced opposite from one another. The container end walls 306 and 308 can extend between the opposed container sidewalls 302 and 304. Similarly, the container sidewalls 302 and 304 can extend between the container end walls 306 and 308.

Each container 300 has a width Ws from one of the sidewalls 302 and 304 to the other one of the sidewalls 302 and 304, and can have a length Ls from one of the end walls 306 and 308 to the other one of the end walls 306 and 308. In some embodiments, the length Ls can be greater than the width Ws. Each storage container 300 can further have an upper end 310 and a lower end 312 spaced opposite from one another. The lower end 312 can include a bottom wall 314 that can extend between the opposed sidewalls 302 and 304 and between the opposed end walls 306 and 308. The upper end 310 can be open for ease of access in placing inventory items into, and retrieving inventory items from, the storage container 300. In some embodiments, the upper end 310 can include a lid or top (not shown) that can be selectively opened and closed. Each container 300 can have a height Hs from the upper end 310 to the bottom wall 314. The sidewalls 302 and 304, the end walls 306 and 308, and the bottom wall 314 can together define an inner cavity 316 that is configured to support at least one inventory item therein. The sidewalls 302 and 304 and the end walls 306 and 308 can taper inwardly as they extend from the upper end 310 towards the lower end 312. Thus, the upper end can have a cross-sectional area in a plane that is parallel to the bottom wall 314 that is greater than a cross-sectional area of the bottom wall 314.

The storage container 300 can include at least one upper edge, such as a plurality of upper edges, that extends outwardly from the upper end 310. For example, the storage container 300 can include an upper edge 328 that extends outwardly from the first sidewall 302, and an upper edge 330 that extends outwardly from the second sidewall 304. The upper edges can together form an upper stiffening rim around the upper end 310. The upper edges can be configured to be engaged by a prong 112 of the end effector 110.

Each storage container 300 may include an identifier (e.g., bar code, QR code, radio-frequency identification (RFID) tag, and any other suitable identifier). The identifier may be used to uniquely identify the storage container 300. In some examples, the identifier may include non-volatile data storage, which may be associated with the storage container 300 and/or its contents. Data can be read/written to the data storage each time the stackable storage module is accessed. This data may contain status of the inventory stowed in the storage container 300, and/or destination information for each storage container 300. In this manner, inventory information may be updated when the identifiers are read.

The prongs 112 of the fork 113 are elongate along a select direction, and are spaced from one another along a perpendicular direction that is substantially perpendicular to the select direction. The select direction and perpendicular directions can be horizontal directions. For example, the select direction can be the lateral direction A, when the fork 113 is rotated such that the each prong 112 extends along the lateral direction A. As another example, the select direction can be the longitudinal direction L, when the fork 113 is rotated such that each prong 112 extends along the longitudinal direction L. The fork 113 is configured to removably couple to a storage container 300. In particular, the fork 113 is configured to receive a storage container 300 therebetween such that each prong 112 is adjacent to a respective one of the sidewalls 302 and 304 of the storage container. The positions of the prongs 112 can be fixed relative to one another such that a distance between the prongs 112 is not changeable. However, in some embodiments, the distance between the prongs 112 can be adjustable based on the size of the storage container before coupling the fork 113 to the storage container 300.

An upper surface of each prong 112 can engage a lower surface of a respective one of the upper edges 328 and 330 of the sidewalls 302 and 304. In some embodiments, each prong 112 of the fork 113 can include at least one protrusion extends upwardly and is configured to be received in a recess defined in a respective one of the upper edges 328 and 330. Receiving the protrusions into the recesses can help secure the storage container 300 to the fork 113.

In some examples, depending on the application for the inventory conveyance system 100, different end effectors may be selected. Information about the end effectors available may be organized in terms of grasping function. A grasping function may define functionally how an end effector is capable of manipulating an object. The grasping function may differ between end effectors with respect to capacities, categories, and physical limitations. Example categories of end effectors include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

Figure 9:
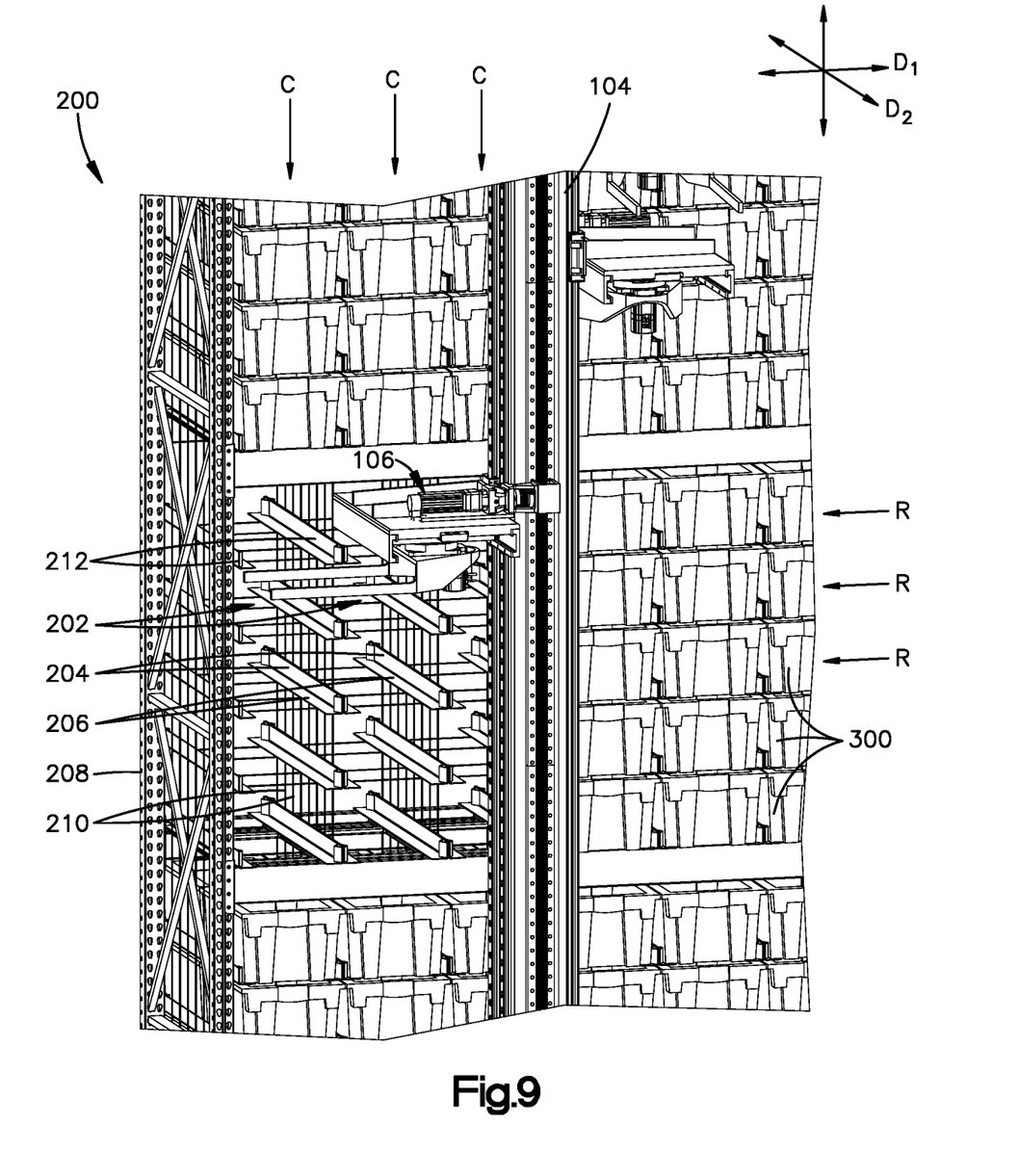
FIG. 9 shows an enlarged view of a portion of the inventory storage structure of FIG. 1 according to one embodiment, the inventory storage structure having a plurality of bins removed for illustrative purposes.

Turning now to FIG. 9, a portion of the inventory storage structure 200 of FIG. 1 is shown according to one embodiment. The inventory storage structure 200 can be configured as a shelving unit. The inventory storage structure 200 defines a vertically-oriented array of storage positions 202 that are arranged in a plurality of rows R and columns C. Each storage position 202 is configured to support an inventory storage container 300 therein. The storage positions 202 in each row R can be offset from one another along the first horizontal direction $D_1$, and the rows R can be offset from one another along the vertical direction V. The storage positions 202 in each column C can be offset from one another along the vertical direction V, and the columns C can be offset from one another along the first horizontal direction $D_1$. As described above, in some embodiments, the first horizontal direction $D_1$ can be aligned with the longitudinal direction L, the second horizontal direction $D_2$ can be aligned with the lateral direction A, and the vertical direction V can be aligned with the transverse direction T.

Each storage position 202 can be defined by at least one support surface 206 that is configured to support a storage container 300 thereon. For example, each storage position 202 can be defined by a pair of support surfaces 206 that are spaced from one another along the longitudinal direction L. The support surfaces 206 in each pair can be spaced from one another by a distance that is less than a width of an inventory storage container 300 along the longitudinal direction L. Thus, the support surfaces 206 of each pair can be spaced from one another by a distance that is sufficient to support corners of the inventory storage container 300 without allowing the storage container 300 to fall between the support surfaces 206. The support surfaces 206 can be configured to support a bottom of an inventory storage container 300. Individual ones of the storage positions 202 can also be defined below at least one overhead support surface 206. Thus, individual ones of the storage positions 202 can be defined between a support surface 206 and an overhead support surface 206.

Each storage position 202 can further be defined by a pair of divider walls 204. Each divider wall 204 can extend upwards or downwards from a corresponding support surface 206. Each divider wall 204 in a pair can be spaced from one another by a distance that is greater than a width of an inventory storage container 300 along the longitudinal direction L. The divider walls 204 of a pair be configured to guide a storage container 300 into a storage position 202 as the storage container is received in the storage position 202, and to maintain a storage container 300 in its storage position 202 after it has been received in the storage position 202.

The inventory storage structure 200 can comprise a plurality of right-angle brackets and/or "T"-shaped brackets 212. The brackets 212 can be elongate along the second horizontal direction $D_2$. Each bracket 212 can include a vertically-oriented wall that defines one of the divider walls 204. Each bracket 212 can include a horizontally-oriented wall that defines at least one of the support surfaces 206. Individual ones of the brackets 212 can be supported by tension rods 208. The brackets 212 can be arranged in a plurality of rows and columns. The brackets 212 in each column can be spaced from one another along the vertical direction V, and the columns of brackets 212 can be spaced from one another along the first horizontal direction $D_1$. The brackets 212 in each row can be spaced from one another along the first horizontal direction $D_1$, and the rows of brackets 212 can be spaced from one another along the vertical direction V.

The inventory storage structure 200 can comprise a plurality of tension rods 210 that support the plurality of brackets 212. The tension rods 210 can couple the brackets 212 in each column of brackets to one another along the vertical direction V. The tension rods 210 can additionally couple the brackets 212 in each row of brackets to one another along the first horizontal direction $D_1$. The inventory storage structure 200 can comprise a frame 208 that is configured to support the support surfaces 206. Thus, the support surfaces 206 can be coupled to the frame 208. For example, the support surfaces 206 can be coupled to the frame 208 by the tension rods 210. It will be understood that the inventory storage structure 200 can have any other suitable configuration for defining a vertically-oriented array of storage positions 202 that are arranged in a plurality of rows R and columns C. For example, the inventory storage structure 200 can comprise as few as one support surface 206 for each row of storage positions 202, rather than a plurality of brackets 212. In such examples, each support surface 206 can be a shelf that defines the storage positions 202 in a row.

Turning now to FIGS. 1 to 9, a method of operating the inventory processing system 10 will be discussed. The method comprises transferring an inventory storage container 300 between a first location and a second location. In one example, the first location can be a select storage position 202 of the inventory storage structure 200 and the second location can be a separate destination 400 that is separate and distinct from the inventory storage structure 200, such as a conveyor surface of a material conveyance device. For example, the method can be a method of transferring an inventory storage container 300 from the select storage position 202 of the inventory storage structure 200 to the separate destination 400. Alternatively, the method can be a method of transferring an inventory storage container 300 from the separate destination 400 to the select storage position 202 of the inventory storage structure 200.

The method comprises causing an inventory transfer vehicle 106 to move along a longitudinal direction L and a transverse direction T, angularly offset from the longitudinal direction L, until the inventory transfer vehicle 106 is aligned with a select storage position 202 of an inventory storage structure 200 that supports a plurality of storage positions 202 arranged in rows R and columns C. This step can comprise causing the inventory transfer vehicle 106 to ride along a transverse track 104 along the transverse direction T until the inventory transfer vehicle 106 is transversely aligned with the select storage position 202. This step can additionally or alternatively comprise causing the transverse track 104 to ride along at least one longitudinal track 102 along a longitudinal direction L until the inventory transfer vehicle 106 is longitudinally aligned with the select storage position 202. The inventory transfer vehicle 106 can be moved along the transverse track 104 before the transverse track 104 is moved along the at least one longitudinal track 102, after the transverse track 104 is moved along the at least one longitudinal track 102, or while the transverse track 104 is moved along the at least one longitudinal track 102.

In some examples, the step of causing the transverse track 104 to ride along at least one longitudinal track 102 can comprise causing the transverse track 104 to ride along first and second longitudinal tracks 102(1) and 102(2), wherein the transverse track 104 extends from the first longitudinal track 102(1) to the second longitudinal track 102(2) along the transverse direction T. In some examples, the step of causing the transverse track 104 to ride along the at least one longitudinal track 102 can comprise actuating an actuator 118, such as a linear induction motor, so to cause the transverse track 104 to ride along the at least one longitudinal track 102. In some examples, the step of causing the transverse track 104 to ride along the at least one longitudinal track 102 can comprise causing wheels of the transverse track 104 to ride along at least one rail 114 of the longitudinal track 102.

The method can comprise a step of causing an end effector 110 supported by the inventory transfer vehicle 106 to move relative to the vehicle body 108 so as to couple to an inventory storage container 300 at the select storage position 202 or decouple from the inventory storage container 300 at the select storage position 202. This step can comprise causing the end effector 110 to rotate relative to the vehicle body 108 about an axis that extends along the transverse direction T until the end effector 110 faces the inventory storage structure 200. In some examples, causing the end effector 110 to rotate can comprise causing a motor 176 to rotate the end effector 110.

This step can additionally or alternatively comprise causing the end effector 110 to move along a lateral direction A, substantially perpendicular to the longitudinal direction L. The step of causing the end effector 110 to move can comprise causing the end effector 110 to ride along at least one lateral track 162 of the inventory transfer vehicle 106. In some examples, causing the end effector 110 to move can comprise actuating an actuator 170, such as a linear induction motor, so to cause the end effector 110 to ride along the at least one lateral track 162. In some examples, causing the end effector 110 to move can comprise causing wheels of the end effector 110 to ride along the at least one lateral track 162. In some examples, the step of causing the end effector 110 to move can comprise causing prongs 112 of a fork 113 of the end effector 110 to move along sidewalls 302 and 304 of a storage container 300 at the select storage position 202 so as to couple the end effector 110 to the storage container 300 or decouple the end effector 110 from the storage container 300.

In examples where the method comprises decoupling the end effector 110 from the inventory storage container 300 at the select storage position 202, the method can be a method of transferring the inventory storage container 300 from the separate destination that is separate and distinct from the inventory storage structure 200 to the select storage position 202 (i.e., a method of stowing the storage container 300 at the inventory storage structure 200). In such a case, the method can comprise, before the decoupling step, causing the end effector 110 to couple to the inventory storage container 300 at the separate destination. This step can comprise causing the end effector 110 to rotate about an axis that extends along the transverse direction T in a manner similar to that described above. This step can additionally or alternatively comprise causing the end effector 110 to move along the lateral direction A in a manner similar to that described above.

In examples where the method comprises coupling the end effector 110 to the inventory storage container 300, the method can be a method of transferring the inventory storage container 300 from the select storage position 202 to the separate destination that is separate and distinct from the inventory storage structure 200 (i.e., a method of retrieving the storage container 300 from the inventory storage structure 200). In such a case, the method can comprise, after the coupling step, causing the inventory transfer vehicle 106 to move along the longitudinal direction L and the transverse direction T to the separate destination that is separate and distinct from the inventory structure 200. This step can comprise causing the inventory transfer vehicle 106 to ride along a transverse track 104 along the transverse direction T in a manner similar to that described above. The step can further comprise causing the transverse track 104 to ride along at least one longitudinal track 102 along a longitudinal direction L in a manner similar to that described above. The inventory transfer vehicle 106 can be moved along the transverse track 104 before the transverse track 104 is moved along the at least one longitudinal track 102, after the transverse track 104 is moved along the at least one longitudinal track 102, or while the transverse track 104 is moved along the at least one longitudinal track 102. The method can then comprise a step of causing the end effector 110 to decouple from the inventory storage container 300 at the separate destination. This step can comprise causing the end effector 110 to rotate about an axis that extends along the transverse direction T in a manner similar to that described above. This step can additionally comprise causing the end effector 110 to move along the lateral direction A in a manner similar to that described above.

In some embodiments, the inventory processing system 10 can be configured to transfer two or more inventory storage containers 300 concurrently. For example, an inventory transfer vehicle 106 coupled to one of the first and second longitudinal sides 146 and 148 of the transverse track 104 can move to couple to, or decouple from, an inventory storage container 300 at the separate destination 400, while a second inventory transfer vehicle 106 coupled to the other one of the first and second longitudinal sides 146 and 148 of the transverse track 104 can move to couple to, or decouple from, an inventory storage container 300 at the inventory storage structure 200. As can be seen in FIG. 1, the transverse track 104 can be at any position along the at least one longitudinal track 102 when an inventory transfer vehicle 106 couples to, or decouples from, an inventory storage container 300 at the separate destination 400. Thus, the method can comprise causing a second inventory transfer vehicle 106 to move along the transverse track 104 so as to transfer a second inventory storage container 300 between the inventory storage structure 200 and the separate destination 400, while the inventory transfer vehicle 106 transfers the inventory storage container 300 between the inventory storage structure 200 and the separate destination 400.

The inventory conveyance system 100 can be configured to unstack inventory storage containers 300 that are stacked on top of one another. For example, the inventory conveyance system 100 can cause a first inventory transfer vehicle 106 to move along the longitudinal direction L and the transverse direction T so as to align with an upper inventory storage container 300 of a stack of inventory storage containers 300. An end effector 110 supported by a vehicle body 108 of the first inventory transfer vehicle 106 can move relative to the vehicle body 108 so as to couple to the upper storage container 300. The first inventory transfer vehicle 106 can lift the upper storage container 300 from a lower storage container 300 of the stacked inventory storage containers 300. The inventory conveyance system 100 can cause a second inventory transfer vehicle 106 to move along the longitudinal direction L and the transverse direction T so as to align with the lower inventory storage container 300. The second inventory transfer vehicle 106 can be coupled to the same longitudinal side 146 or 148 as the first inventory transfer vehicle 108 or can be coupled to the opposite side. An end effector 110 supported by a vehicle body 108 of the second inventory transfer vehicle 106 can move relative to the vehicle body 108 so as to couple to the lower storage container 300. The inventory conveyance system 100 can cause the second inventory transfer vehicle 106, and hence the lower storage container 300, to move along at least one of the longitudinal direction L and the transverse direction T. In some examples, the first inventory transfer vehicle 106 can return the upper storage container 300 to the previous location of the lower storage container 300. Thus, the method can be a method of extracting a lower storage container 300 from a stack of storage containers 300 without relocating one or more storage containers that were stacked over the lower storage container 300.

The inventory conveyance system 100 can be configured to stack inventory storage containers 300 on top of one another. For example, the inventory conveyance system 100 can cause a first inventory transfer vehicle 106 to move along the longitudinal direction L and the transverse direction T so as to align with a first inventory storage container 300. An end effector 110 supported by a vehicle body 108 of the first inventory transfer vehicle 106 can move relative to the vehicle body 108 so as to couple to the first storage container 300. The inventory conveyance system 100 can cause a second inventory transfer vehicle 106 to move along the longitudinal direction L and the transverse direction T so as to align with the second inventory storage container 300. The second inventory transfer vehicle 106 can be coupled to the same longitudinal side 146 or 148 as the first inventory transfer vehicle 108 or can be coupled to the opposite side. An end effector 110 supported by a vehicle body 108 of the second inventory transfer vehicle 106 can move relative to the vehicle body 108 so as to couple to the second storage container 300. The inventory conveyance system 100 can cause the first inventory transfer vehicle 106 to move its corresponding storage container 300 to a first location. The inventory conveyance system 100 can cause the second inventory transfer vehicle 106 to move its corresponding storage container 300 to a second location that is stacked on top of the first storage container 300. Note that the steps of moving the second inventory transfer vehicle 106 and coupling to the second storage container 300 can be performed before, during, or after, the steps of moving the first inventory transfer vehicle 106 and coupling to the first storage container 300.

It should be noted that the illustrations and descriptions of the examples and embodiments shown in the figures are for exemplary purposes only, and should not be construed limiting the disclosure. One skilled in the art will appreciate that the present disclosure contemplates various embodiments. Additionally, it should be understood that the concepts described above with the above-described examples and embodiments may be employed alone or in combination with any of the other examples and embodiments described above. It should further be appreciated that the various alternative examples and embodiments described above with respect to one illustrated embodiment can apply to all examples and embodiments as described herein, unless otherwise indicated.

Unless explicitly stated otherwise, each numerical value and range should be interpreted as being approximate as if the word "about," "approximately," or "substantially" preceded the value or range. The terms "about," "approximately," and "substantially" can be understood as describing a range that is within 15 percent of a specified value unless otherwise stated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. An inventory processing system configured to transfer inventory storage containers, the inventory processing system comprising:
    an inventory storage structure that supports a plurality of storage positions arranged in a vertically-oriented array of rows that extend along a longitudinal direction and columns that extend along a transverse direction, substantially perpendicular to the longitudinal direction; and
    an inventory conveyance system comprising:
        first and second longitudinal tracks that are elongate along the longitudinal direction;
        a transverse track that extends from the first longitudinal track to the second longitudinal track along the transverse direction; and
        an inventory transfer vehicle coupled to the transverse track, the inventory transfer vehicle comprising a vehicle body with a lateral track disposed at an underside of the vehicle body, an end effector supported by the vehicle body such that the end effector moves along the lateral track, and a coupler that rotationally couples the end effector to the body at an underside of the body, the end effector having a pair of prongs that are offset from one another so as to define a fork that projects out from the underside of the body and is configured to receive a storage container between the pair of prongs,
    wherein the transverse track is configured to ride along the first and second longitudinal tracks along the longitudinal direction so as to carry the inventory transfer vehicle along the longitudinal direction until the inventory transfer vehicle is longitudinally aligned with a select storage position of the inventory storage structure, the inventory transfer vehicle is configured to ride along the transverse track along the transverse direction until the inventory transfer vehicle is transversely aligned with the select storage position.

2. The inventory processing system of claim 1, wherein the inventory transfer vehicle has a lateral track that extends along a lateral direction, substantially perpendicular to the longitudinal and transverse directions, and the end effector is configured to translate along the lateral track along the lateral direction.

3. The inventory processing system of claim 1, wherein the fork is configured to rotate relative to the vehicle body about an axis that extends along the transverse direction.

4. The inventory processing system of claim 1, wherein the inventory conveyance system comprises a second inventory transfer vehicle coupled to the transverse track, the second inventory transfer vehicle comprising a second vehicle body, and a second end effector supported by the second vehicle body, the second end effector having a second pair of prongs that are offset from one another so as to define a second fork that is configured to receive a storage container between the second pair of prongs.

5. An inventory conveyance system, comprising:
    at least one longitudinal track that is elongate along a longitudinal direction;
    at least one transverse track that extends from the first longitudinal track along a transverse direction that is angularly offset from the longitudinal direction, the transverse track configured to ride along the at least one longitudinal track along the longitudinal direction; and
    at least one inventory transfer vehicle coupled to the at least one transverse track such that the inventory transfer vehicle is configured to ride along the at least one transverse track along the transverse direction, the at least one inventory transfer vehicle comprising a body with a lateral track disposed at an underside of the vehicle body, at least one end effector configured to move along the lateral track, and a coupler that rotationally couples the at least one end effector to the body at an underside of the body, the at least one end effector having a pair of prongs that are offset from one another so as to define a fork that projects out from the underside of the body and is configured to receive opposing sidewalls of an inventory storage container between the pair of prongs to removably couple to the inventory storage container.

6. The inventory conveyance system of claim 5, wherein the inventory transfer vehicle has a lateral track that extends along a lateral direction, substantially perpendicular to the longitudinal and transverse directions, and the end effector is configured to translate along the lateral track along the lateral direction.

7. The inventory conveyance system of claim 5, wherein the end effector is configured to rotate relative to the vehicle body about an axis that extends along the transverse direction.

8. The inventory conveyance system of claim 5, wherein the at least one transverse track has at least one rack gear, and the inventory transfer vehicle has a pinion gear that engages the rack gear so as to cause the inventory transfer vehicle to move along the at least one transverse track.

9. The inventory conveyance system of claim 5, comprising at least one linear induction motor that is configured to drive the at least one transverse track to move along the longitudinal direction, the at least one linear induction motor having a primary and a secondary, the primary being implemented by the at least one longitudinal track, and the secondary being implemented by the at least one transverse track.

10. The inventory conveyance system of claim 5, wherein the inventory conveyance system comprises a second inventory transfer vehicle coupled to the transverse track, the second inventory transfer vehicle comprising a second vehicle body, and a second end effector supported by the second vehicle body.

11. The inventory conveyance system of claim 10, wherein the transverse track has first and second longitudinal sides that are spaced from one another along the longitudinal direction, the inventory transfer vehicle is coupled the first longitudinal side, and the second inventory transfer vehicle is coupled to the second longitudinal side.

12. The inventory conveyance system of claim 11, wherein the inventory transfer vehicle is coupled to at least one rail at the first longitudinal side, and the second inventory transfer vehicle is coupled to at least one rail at the second longitudinal side.

13. The inventory conveyance system of claim 12, wherein the transverse track has first and second lateral sides that are spaced from one another along a lateral direction, the inventory transfer vehicle has a first pinion gear that engages a first rack gear at the first lateral side, and the second inventory transfer vehicle has a second pinion gear that engages a second rack gear at the second lateral side.

14. A method of transferring an inventory storage container, the method comprising:
 a) causing an inventory transfer vehicle to move along a longitudinal direction and a transverse direction, angularly offset from the longitudinal direction, until the inventory transfer vehicle is aligned with a select storage position of an inventory storage structure that supports a plurality of storage positions arranged in rows and columns, the causing step comprising:
  a1) causing the inventory transfer vehicle to ride along a transverse track along the transverse direction until the inventory transfer vehicle is transversely aligned with the select storage position; and
  a2) causing the transverse track to ride along at least one longitudinal track along the longitudinal direction until the inventory transfer vehicle is longitudinally aligned with the select storage position; and
 b) causing a pair of prongs of an end effector supported by a vehicle body of the inventory transfer vehicle at an underside of the vehicle body to move relative to the vehicle body and along opposing sidewalls of a storage container such that the prongs 1) at least partially extend out from the underside and couple to an inventory storage container at the select storage position or 2) at least partially retract under the underside and decouple from the inventory storage container at the select storage position.

15. The method of claim 14, wherein step a2) comprises causing the transverse track to ride along first and second longitudinal tracks, wherein the transverse track extends from the first longitudinal track to the second longitudinal track along the transverse direction.

16. The method of claim 14, wherein step b) comprises causing the end effector to rotate relative to the vehicle body about an axis that extends along the transverse direction until the end effector faces the inventory storage structure.

17. The method of claim 14, wherein step b) comprises causing the end effector to move relative to the vehicle body along a lateral direction, substantially perpendicular to the longitudinal and transverse directions.

18. The method of claim 14, wherein:
 the method comprises, before step a), causing the end effector to couple to the inventory storage container at a separate destination that is separate and distinct from the inventory storage structure;
 step a) comprises causing the inventory transfer vehicle to move along the longitudinal direction and the transverse direction from the separate destination to the select storage position; and
 step b) comprises decoupling the end effector from the inventory storage container at the select storage position.

19. The method of claim 14, wherein:
 step b) comprises coupling the end effector to the inventory storage container at the select storage position; and
 the method comprises:
  c) causing the inventory transfer vehicle to move the inventory storage container from the select storage position along the longitudinal direction and the transverse direction to the separate destination; and
  d) decoupling the end effector from the inventory storage container at the separate destination.

20. The inventory processing system of claim 1, comprising the storage container, wherein the storage container has a pair of opposed sidewalls and at least one upper edge that extends out from the opposed sidewalls, and wherein the pair of prongs are configured to receive the opposed sidewalls therebetween such that the pair of prongs engage the at least one upper edge.

21. The inventory conveyance system of claim 5, wherein the vehicle body has a first side and a second side that are spaced from one another along the longitudinal direction, and a first end and a second end that are spaced from one another along the lateral direction, and wherein the end effector is coupled to the vehicle body at a position that is between the first and second side and between the first and second end.

22. The inventory processing system of claim 1, wherein the inventory storage structure comprises a plurality of brackets that are spaced from one another in a plurality of rows and columns, each bracket including a vertically-oriented wall that defines a divider wall, and a horizontally-oriented wall that defines a support surface configured support a storage container thereon, wherein each storage position is defined between a pair of the divider walls.

* * * * *